United States Patent [19]

Iwafune et al.

[11] Patent Number: 5,181,976
[45] Date of Patent: Jan. 26, 1993

[54] PNEUMATIC TIRE HAVING EXPANDED OUTER TREAD RUBBER LAYER

[75] Inventors: Seiichiro Iwafune, Hoyao; Kojiro Yamaguchi, Kodaira; Eiji Takiguchi, Higashiyamamto; Toshiro Iwata, Musashimurayama, all of Japan

[73] Assignee: Bridgestone Corporation, Tokyo, Japan

[21] Appl. No.: 617,472

[22] Filed: Nov. 26, 1990

Related U.S. Application Data

[63] Continuation of Ser. No. 237,202, Aug. 29, 1988, abandoned.

[30] Foreign Application Priority Data

Sep. 3, 1987 [JP] Japan ................................ 62-220697
Oct. 30, 1987 [JP] Japan ................................ 62-275338

[51] Int. Cl.⁵ .............................................. B60C 11/00
[52] U.S. Cl. .................................................. 152/209 R
[58] Field of Search .......... 152/209 R, 209 A, 209 D; 524/495, 496; 156/123

[56] References Cited

U.S. PATENT DOCUMENTS

| | | |
|---|---|---|
| 4,007,069 | 2/1977 | Takayanagi et al. ............... 156/123 |
| 4,249,588 | 2/1981 | Egan .................................. 152/209 R |
| 4,398,582 | 8/1983 | Yuto et al. |
| 4,644,988 | 2/1987 | Ahmad et al. .................. 524/496 X |
| 4,784,695 | 11/1988 | Mito et al. ...................... 524/496 X |

FOREIGN PATENT DOCUMENTS

| | | |
|---|---|---|
| 0209125 | 7/1986 | European Pat. Off. . |
| 3703480 | 8/1987 | Fed. Rep. of Germany ... 152/209 R |
| 40-4641 | 3/1965 | Japan . |
| 56-154304 | 11/1981 | Japan . |
| 62-28001 | 6/1987 | Japan . |
| 2140447 | 5/1984 | United Kingdom . |

OTHER PUBLICATIONS

Samuel K. Clark, ed., "Mechanics of Pneumatic Tires," Aug. 1981, pp. 29-33.

*Primary Examiner*—Geoffrey L. Knable
*Attorney, Agent, or Firm*—Sughrue, Mion, Zinn, Macpeak & Seas

[57] ABSTRACT

A pneumatic tire having excellent tire performances in winter and summer seasons comprises a tread, a part of which is comprised of an expanded rubber in a volume corresponding to at least 10% of the total volume of the tread at its surface. This expanded rubber contains particular rubber component and particular high reinforcing carbon black and oil, and has particular number of closed cells having a specified cell diameter to the total number of closed cells. Furthermore, a rubber reinforcing layer is arranged near to the tread shoulder.

5 Claims, 1 Drawing Sheet

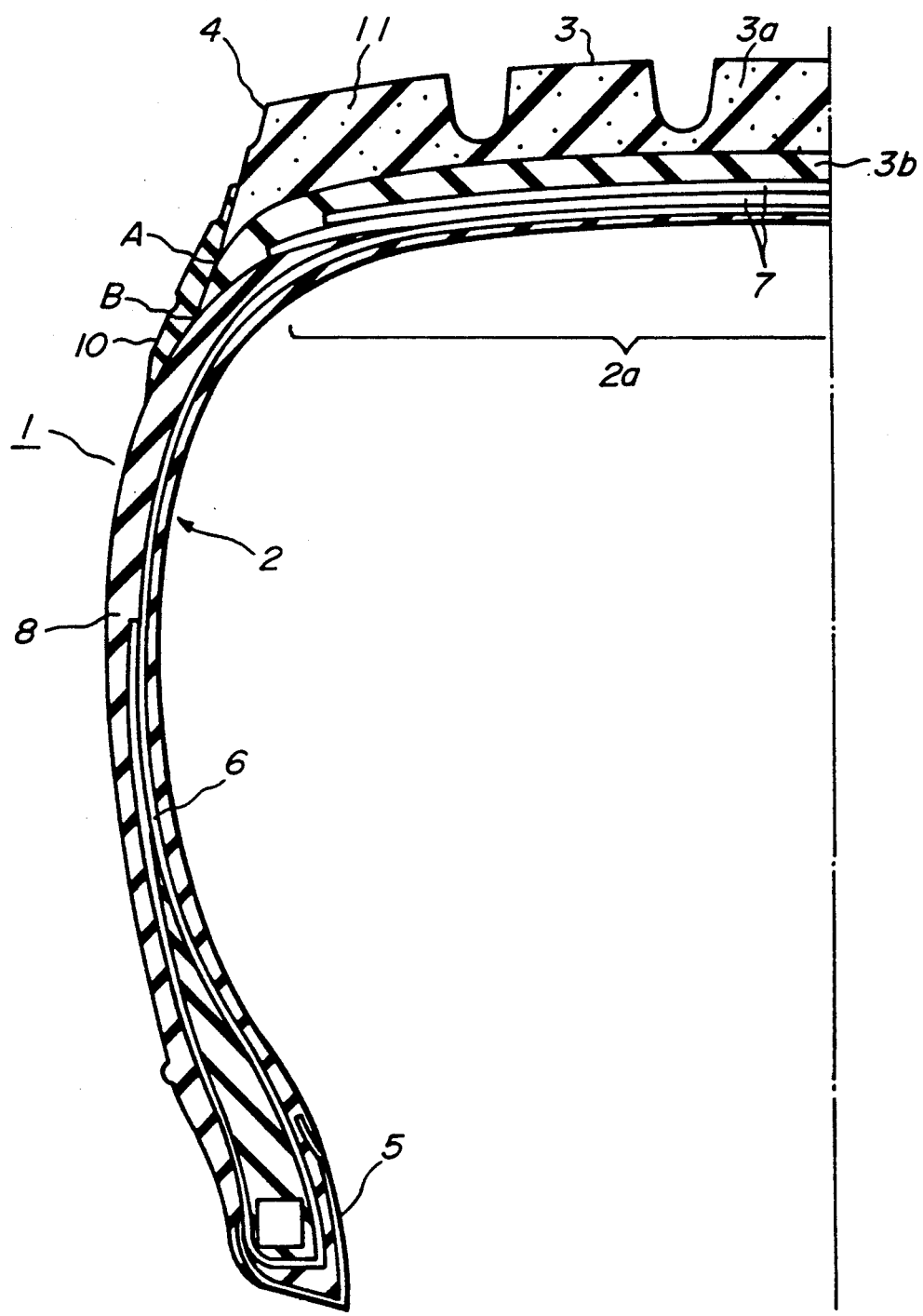

PNEUMATIC TIRE HAVING EXPANDED OUTER TREAD RUBBER LAYER

This is a continuation of application Ser. No. 07/237,202 filed Aug. 29, 1988, now abandoned.

BACKGROUND OF THE INVENTION

1. Field of the Invention

This invention relates to pneumatic tires, and more particularly to a pneumatic tire having considerably improved durability, in which wear resistance is durable in practical use without damaging the cornering performances and heat durable performance in summer season as well as spring and autumn seasons (hereinafter referred to as summer season). Also ice and snow performances such as driving performance, braking performance, cornering performance and the like on ice and snow road surface in winter season are improved and further dynamic compression permanent deformation (so-called flattening resistance) and separation resistance are improved.

2. Related Art Statement

In conventional pneumatic tires, in order to ensure driving performance, braking performance and cornering performance during the running on ice and snow road surface (hereinafter referred to as ice-snow performances, simply), a chain is attached to the tire. Alternatively a spike tire is obtained by striking spiked pins into a surface portion of a tire tread and is frequently used. However, microparticles produced by wearing of the chain and spike pins or the wearing of the road are scattered to cause dust nuisance. Also road damage is caused by the spike pins, which comes into a large social problem. For this end, a so-called studless tire using no spike pin has been recently proposed, and various investigations on the tread pattern and rubber material for such a studless tire are made. However, the ice-snow performances of the studless tire are not yet developed up to a level equal to those of the spike tire. Particularly, there is an attempt that in order to ensure rubbery elasticity at a low temperature, a polymer having a low glass transition point is used as the rubber material for the tread. An attempt has been made that a softening agent having a low melting point is used for ensuring the friction coefficient on road surface at a low temperature, and the like, but these attempts are still insufficient in ice-snow performances.

On the other hand, tires using an expanded rubber in the tread are proposed in Japanese Patent Application Publication No. 40-4,641, Japanese Patent laid open No. 56-154,304 and U.S. Pat. No. 4,249,588. In Japanese Patent Application Publication No. 40-4,641, however, a synthetic rubber having a large hysteresis loss such as high-styrene rubber is used in the tread, which raises the glass transition point of rubber to increase the hardness of rubber at a low temperature, so that it is unfavorable in view of the ice-snow performances.

Further, Japanese Patent laid open No. 56-154,304 discloses a light weight tire by using an expanded rubber so as to provide a hardness equal to that of nonexpanded rubber, which can not improve the ice-snow performances.

Moreover, when the tire using the expanded rubber in the tread is used over a long period on dry road surface and ice and snow road surface, the wearing of the tread rubber is fast and the wear resistance is not sufficient. In this connection, the improvement of the expanded rubber for solving the above problem has previously been proposed in Japanese Patent Application No. 61-235,921, but it has been confirmed that the flattening resistance is not yet sufficient in practical use.

SUMMARY OF THE INVENTION

It is, therefore, an object of the invention to provide a pneumatic tire durable in practical use in which a tread rubber is composed of an expanded rubber containing a particular rubber component and a particular high-reinforcing carbon black and having specific expansion ratio and cell diameter distribution to cause no flattening phenomenon and lessen the change of hardness of the expanded rubber with the lapse of time even if the tire is used on ice and snow road surface over a long period.

The inventors have made various studies in order to solve the above problems and found the following points.

That is, in the tire tread having the expanded rubber layer, it has been found that a particular rubber composition obtained by compounding a proper amount of high reinforcing carbon black and a particular amount or less of an oil with a particular rubber component is effective as an expanded rubber in order to prevent the flattening phenomenon of blocks and maintain the wear resistance.

Further, it has been found that in the expanded rubber comprised of the above particular rubber composition, the optimization of cell diameter distribution in the expanded rubber is more effective for the solution of the above problems.

The inventors have made further investigations and as a result the invention has been accomplished.

According to the invention, there is provided a pneumatic tire comprising a tire casing and a tread covering a crown portion of said casing, characterized in that said tread is provided at its surface side with an expanded rubber layer in a volume corresponding to at least 10% of a total volume of said tread; and said expanded rubber layer is comprised of an expanded rubber containing not less than 50 parts by weight of at least one rubber component selected from natural rubber, polybutadiene rubber and styrene-butadiene copolymer rubber having a glass transition temperature of not higher than $-45°$ C., a high reinforcing carbon black having an $N_2SA$ of $90 \sim 180$ m$^2$/g and not more than 20 parts by weight of an oil per 100 parts by weight of said rubber component; and said expanded rubber contains closed cells at an expansion ratio (Vs) of $5 \sim 50$ % so that the number of closed cells having a cell diameter of $5 \sim 30$ $\mu$m is not less than 50% of total number of closed cells having a cell diameter of not less than 5 $\mu$m per unit area as a whole of said expanded rubber.

In a preferred embodiment of the invention, the tread consists of an outer layer portion comprised of the expanded rubber layer and an inner layer portion and is provided near to a shoulder thereof with a rubber reinforcing layer covering a first joint end part between the outer layer portion and the inner layer portion and a second joint end part between the inner layer portion and a sidewall portion.

BRIEF DESCRIPTION OF THE DRAWING

The invention will be described with reference to the accompanying drawing, wherein:

A single figure is a partial section view of an embodiment of the pneumatic tire according to the invention.

DESCRIPTION OF THE PREFERRED EMBODIMENTS

According to the invention, it is necessary that at least one of natural rubber, polybutadiene rubber and styrene-butadiene copolymer rubber is contained in an amount of not less than 50 parts by weight as a rubber component. Preferably, the amount of polybutadiene rubber is not less than 20 parts by weight but not more than 50 parts by weight. The reason why the rubber component is limited to the aforementioned rubbers is due to the fact that the tread containing such rubber has a sufficient rubber elasticity even at a low temperature.

Further, the reason why the N₂SA of the high reinforcing carbon black is limited to 90~180 m²/g is based on the fact that when the N₂SA is less than 90 m²/g or more than 180 m²/g, the effect of the invention can not be developed. Moreover, the value of N₂SA is measured according to a test method of ASTM D3037-B. The amount of the high reinforcing carbon black is preferable to be 30~70 parts by weight per 100 parts by weight of the rubber component. When the amount is less than 30 parts by weight, the wear resistance is degraded, while when it exceeds 70 parts by weight, the processability is degraded. As the high reinforcing carbon black, carbon blacks of ISAF and SAF grades are desirable, and particularly carbon black SAF is preferable.

The oil is added in an amount of not more than 20 parts by weight, preferably not more than 10 parts by weight, more particularly not more than 5 parts by weight per 100 parts by weight of the rubber component. In this case, the expanded rubber may contain no oil. When the amount of the oil exceeds 20 parts by weight, the wear resistance is degraded.

Furthermore, the expanded rubber layer should have a volume corresponding to at least 10% of total volume of the tread. The volume of the expanded rubber layer is preferably within a range of 10~70%, particularly 40~60%. When the volume of the expanded rubber layer is less than 10%, the effect of improving the ice-snow performances is small.

According to the invention, the whole of the tread may be comprised of only the expanded rubber layer (i.e. 100% expanded rubber layer).

The expansion ratio Vs of the expanded rubber is represented by the following equation:

$$Vs = \{(\rho_0 - \rho_g)/(\rho_1 - \rho_g) - 1\} \times 100 \ (\%) \quad (1)$$

where $\rho_1$ is a density of the expanded rubber (g/cm²), $\rho_0$ is a density of solid rubber phase portion in the expanded rubber (g/cm²) and $\rho_g$ is a density of gas portion in cells of the expanded rubber (g/cm³). That is, the expanded rubber is comprised of solid rubber phase portions and cavities formed by the solid rubber phase portion (closed cells) or gas portions in the cells. Since the density $\rho_g$ of the gas portion is very small and substantially approaches to zero and also is very small to the density $\rho_1$ of the solid rubber phase portion, the above equation (1) is approximately equal to the following equation:

$$Vs = \{(\rho_0/\rho_g - 1\} \times 100 \ (\%) \quad (2)$$

According to the invention, the expansion ratio Vs is within a range of 5~50%, preferably 5~30%. When the expansion ratio is less than 5%, the flexiblity of the expanded rubber is not developed at a low temperature, while when it exceeds 50%, the wear resistance is degraded and becomes practically insufficient on ice and snow road surface as well as on a dry road surface.

In the expanded rubber according to the invention, the number of closed cells having a cell diameter of 5~30 μm, preferably 5~25 μm is not less than 50% of total number of closed cells having a cell diameter of not less than 5 μm per unit area as a whole of the expanded rubber. The reason why the number of the closed cells having a cell diameter of 5~30 μm is limited to not less than 50% of the total number of the closed cells per unit area is due to the fact that when the cell diameter is less than 5 μm, the braking performance on ice road surface is degraded. While when it exceeds 30 μm, the wear resistance is degraded and the flattening phenomenon is caused to degrade the appearance of the tire.

In general, when the tire as in the invention is used in a vehicle running on ice and snow road, it is liable to cause crack growth at a state of applying tension to the tire surface because the expanded rubber is soft. That is, cut damage may be entered into the vicinity of the tread shoulder through broken stones or pebble stones. If the tire is run after the attachment of a chain, damage or the like may be entered into the shoulder portion. From these damages, cracks may grow and finally separation failure may be caused in the interior of the tire.

In this connection, the inventors have made various studies with respect to action of road surface to tread during the running, relation between function of each part of the tread and properties thereof, occurrence of cut damage in the vicinity of the shoulder, position of generating separation failure, state of proceeding such failure and the like. As a result, it has been found that the tread is rendered into a two-layer structure of an outer layer portion and an inner layer portion to thereby divide the function thereof. Also the balance in the properties between the outer layer portion and the inner layer portion is taken by adjusting the volume of the outer layer portion composed of the expanded rubber and making the modulus of elasticity of the inner layer portion large, whereby the cornering performance and other performances are improved. Further, it has been found that the occurrence and growth of the failures can be prevented by covering a joint part between different rubbers in the vicinity of the shoulder with a rubber reinforcing layer having adequate properties.

That is, in the preferred embodiment of the invention, the tread consists of an outer layer portion comprised of the expanded rubber layer and a non-expanded rubber inner layer portion and is provided near to a shoulder thereof with a non-expanded rubber reinforcing layer covering a first joint end part between the outer layer portion and the inner layer portion and a second joint end port between the inner layer portion and a sidewall portion. Thereby the function of the tread is divided and also the shoulder portion is reinforced to enhance the ice-snow performances in winter season, various performances in summer season and the durability.

The reason why the tread is rendered into the two-layer structure of outer layer portion and inner layer portion is based on the fact that the hardness of the inner layer portion is made harder than that of the outer layer portion to rise the rigidity of blocks as a surface pattern in the outer layer portion of the tread. The performances on snow in winter season, cornering stability and braking performance on ice are improved and the performances between summer season and winter season can be simultaneously established. Further, the hardness of the expanded rubber in the outer layer portion of the tread is within a range of 35°~59°, preferably 43°~53° according to JIS K6301. When the tread rubber is made softer, the true ground contact area of the tread can be increased to enhance the performances on ice, but the rigidity of the blocks in the tread is reduced to degrade the cornering stability on snow.

On the other hand, the reason why the first and second joint end parts are covered with the rubber reinforcing layer is due to the fact that a non-expanded skin layer of about 0.3 μm in thickness is usually existent in the outer surface of the expanded rubber and the boundary between the expanded rubber and the other rubber. Further, the expanded rubber is poor in the resistance to crack growth under a tension as compared with the ordinary rubber, so a crack is particularly apt to be caused from a side face of the block located in the shoulder of the tread. That is, in the conventional tread of the two-layer structure, the expanded rubber having a skin layer of about 0.3 μm is existent in the vicinity of the shoulder being most liable to be subjected to cut damage and the like, resulting in the degradation of separation resistance and cut resistance from the side face of the tread. On the contrary, in the invention, the rubber reinforcing layer is arranged to cover the skin layer of the expanded rubber in the shoulder and the joint end parts, whereby the cut resistance and separation resistance are improved in the vicinity of the shoulder.

The expanded rubber in the tread of the pneumatic tire according to the invention is formed by adding an expanding agent to the usual rubber composition and curing them according to the usual tire building process. As the expanding agent for the expanded rubber, use may be made, for example, of azodicarbon amide, dinitrosopentamethylene tetramine, azobisisobutyronitrile, benzene sulphonyl hydrazide, oxybis-benzene sulphonyl hydrazide, microcapsule of high boiling hydrocarbon resin and the like. Preferably, the sulphonyl hydrazide compounds, particularly oxybisbenzene sulphonyl hydrazide are used in view of fine expansion.

The following examples are given in illustration of the invention and are not intended as limitations thereof. In these examples, the properties of the expanded rubber and tire performances were evaluated by the following test methods.

(1) Expansion Ratio Vs

The expansion ratio Vs of the expanded rubber was determined according to the aformentioned equation (2) after a block-like specimen was cut out from the expanded rubber layer in the tread of the test tire and the density $\rho_1$ (g/cm$^3$) of the specimen was measured and the density $\rho_0$ of non-expanded rubber (solid phase rubber) of the tread was measured.

(2) Cell diameter and number of closed cells

The cell diameter and number of closed cells in the expanded rubber were determined as follows. That is, a block-like specimen was cut out from the expanded rubber layer in the tread of the test tire and the cut surface of the specimen was photographed by means of an optical microscope with a magnification of 100~400, from which the cell diameter of the closed cell was measured. Then, the number of cells having a cell diameter of not less than 5 μm was measured over a total area of 4 mm$^2$ or more, from which the number of closed cells per unit area of 1 mm$^2$ was calculated.

(3) Flattening appearance (appearance of dynamic compression permanent deformation)

After two test tires were mounted onto a driving shaft of a passenger car having a displacement of 1,500 cc and run on a general road over a distance of 20,000 km, the deformation quantity of each block in the block pattern of the tread was measured. The deformation quantity of block was represented by a ratio (%) of displacement b of outer edge of the block in a certain deformation direction to height a ranging from groove bottom of the block to outer surface of the block, wherein a case that the ratio b/a is 0~10% was ⊚, a case of 10~20% was ◯, a case of 20~30% was △ and a case of more than 30% was x. The flattening phenomenon became larger and degraded in this order.

(4) Wear Resistance

After two test tires were mounted onto a driving shaft of a passenger car having a displacement of 1,500 cc and run on concrete road surface of a test course at a given speed, the variation of groove depth was measured. The wear resistance was represented by an index on the basis that the comparative tire was 100. The larger the index value, the better the wear resistance.

(5) Braking Performance on Ice

After four test tires were attached to a passenger car having a displacement of 1,500 cc, the braking distance was measured on ice at a temperature of −5° C. The value was represented by an index when the comparative tire was 100. The smaller the index value, the better the braking performance.

(6) Change of Hardness with Lapse of Time

As to the ice-snow performances such as braking performance on ice, hill climbing performance on snow and the like, the change of hardness of rubber block in the surface portion of the tire was measured with the lapse of time. That is, after the tire was trained over a distance of 100 km, the hardness of the block (initial hardness Hd) was measured, and then the hardness after the running over a distance of 5,000 km was measured. Moreover, the measurement of the hardness was performed according to JIS K6301, type A at 25° C.

Then, the examples of the invention will be described with reference to the drawing.

EXAMPLES 1~3, COMPARATIVE EXAMPLES 1~5

A single figure shows a first embodiment of the pneumatic tire according to the invention (Example 1).

As shown in the single figure, the pneumatic tire 1 (tire size: 165 SR13) comprises a tire casing 2, and a tread 3 covering a region between shoulders 4 of a crown portion 2a of the casing 2. The casing 2 comprises a pair of bead portions 5, a carcass portion 6 composed of a rubberized cord ply extending between the bead portions 5 and containing cords substantially arranged in the radial direction, and a belt portion 7 superimposed about a crown of the carcass portion 6 and arranged substantially in the circumferential direction of the tire. In the casing 2, sidewalls 8 are arranged on both outer sides of the carcass portion 6 in the axial direction of the tire.

The tread 3 consists of an outer layer portion 3a contacting with ground surface and an inner layer portion 3b located inside the outer layer portion 3a. The volume of the outer layer portion 3a is 60% of the total volume of the tread 3.

In the vicinity of the tire shoulder 4 are formed a first joint end part A of contact line between the outer layer portion 3a and the inner layer portion 3b in the circumferential direction of the tread 3 and a second joint end part B of contact line between the inner layer portion 3b and the sidewall 8 in the circumferential direction toward the bead portion. A rubber reinforcing layer 10 of a triangular shape in section is arranged over a region ranging from each side face of the tread to the sidewall 8 to cover the first joint end part A and the second joint end part B as well as a part of side face of the outer layer portion 3a, a side face of the inner layer portion 3b and a part of side face of the sidewall 8.

The outer layer portion 3a of the tread 3 is composed of an expanded rubber having a composition shown in the following Table 1. The hardness of the expanded rubber is 52. On the other hand, the inner layer portion 3b has a hardness Hd of 60 which is higher than that of the outer layer portion 3a and is composed of a rubber composition containing 80 parts by weight of carbon black and 15 parts by weight of oil based on 100 parts by weight of natural rubber and further containing usual additives. The sidewall 8 is a usual rubber having an excellent flexural resistance. The rubber reinforcing layer 10 is a rubber having excellent flexural resistance and cut resistance.

The above expanded rubber corresponds to a rubber composition (composition 4) as shown in Table 1, i.e. a rubber composition containing 50 parts by weight of high reinforcing carbon black N110 based on 100 parts by weight of rubber component consisting of 60 parts by weight of natural rubber (glass transition temperature: −72° C.) and 40 parts by weight of polybutadiene rubber (glass transition temperature: −100° C.) and containing no aromatic oil. This rubber composition further contains usual additives and an expanding agent (3 parts by weight of each of dinitrosopentamethylene tetramine and urea). Furthermore, the high reinforcing carbon black N110 has an $N_2SA$ of 143 $m^2/g$. This rubber composition is built according to the usual tire manufacturing process and cured at an curing pressure index of 125 higher by 25% than the usual pressure in the curing, whereby closed cells 11 are formed.

The expanded rubber (composition 4) used in the tire of Example 1 contains closed cells 11 at an expansion ratio Vs of 23% as shown in the following Table 2, wherein the number of closed cells having a cell diameter of 5~30 μm is 70% of total number of closed cells having a cell diameter of not less than 5 μm per unit area as a whole of the expanded rubber. The structure other than the tread 3 and the tire manufacturing method are the same as in the usual pneumatic tire, so that the detailed description is omitted here.

Then, the test results on the performances of the pneumatic tires according to the invention will be described below.

By using each of the rubber compositions shown in Table 1, there are prepared 8 test tires (Examples 1~3, Comparative Examples 1~5). The tire of Example 1 is a tire shown in the single figure as previously mentioned. In Examples 2 and 3 and Comparative Examples 1 to 5, the outer layer portion of the tread is formed by using the rubber composition shown in Table 1 other than the composition 4. In Example 3, the number of closed cells having a cell diameter of 5~30 μm is 90% of the total number of closed cells. In Comparative Example 1, the expanding agent is not used. In Comparative Examples 2 and 3, the number of closed cells having a cell diameter of 5~30 μm is less than 50% of the total number of closed cells. In Comparative Exam-

TABLE 1

| Kind of tread rubber composition | | Composition 1 | Composition 2 | Composition 3 | Composition 4 | Composition 5 | Composition 6 | Composition 7 | Composition 8 |
|---|---|---|---|---|---|---|---|---|---|
| Natural rubber (glass transition temperature: −72° C.) | | 60 | 60 | 60 | 60 | 60 | 60 | 60 | 60 |
| Polybutadiene rubber (glass transition temperature: −100° C.) | | 40 | 40 | 40 | 40 | 40 | 40 | 40 | 40 |
| Carbon black | N 330 *1 | 75 | 75 | 60 | 0 | 0 | 0 | 0 | 0 |
| | N 110 *2 | 0 | 0 | 0 | 50 | 50 | 50 | 25 | 50 |
| Aromatic oil | | 20 | 20 | 15 | 0 | 5 | 0 | 0 | 0 |
| Stearic acid | | 1.5 | 1.5 | 1.5 | 1.5 | 1.5 | 1.5 | 1.5 | 1.5 |
| Zinc white | | 3.0 | 3.0 | 3.0 | 3.0 | 3.0 | 3.0 | 3.0 | 3.0 |
| Vulcanization accelerator | | 1.5 | 0.7 | 0.7 | 0.7 | 1.5 | 1.5 | 1.5 | 0.7 |
| Sulfur | | 1.8 | 1.8 | 2.5 | 1.5 | 1.5 | 1.5 | 1.8 | 1.8 |
| Expanding agent | dinitrosopentamethylene tetramine | 0 | 2.5 | 2.5 | 3.0 | 0 | 0 | 0 | 0 |
| | urea | 0 | 2.5 | 2.5 | 3.0 | 0 | 0 | 0 | 0 |
| | oxybis-benzene sulphonyl hydrazide | 0 | 0 | 0 | 0 | 5.5 | 6.5 | 6.5 | 4.2 |

*1: N 330 has $N_2$ SA of 85 $m^2/g$.
*2: N 110 has $N_2$ SA of 143 $m^2/g$.

ple 4, the amount of carbon black is outside the range defined in the invention. In Comparative Example 5, the number of closed cells having a particular cell diameter is less than 50% of the total number of closed cells and the closed cells having a cell diameter of not more than 5 μm are existent.

As the performance of the pneumatic tire, the braking performance on ice, flattening appearance, wear resistance and change of hardness of the expanded rubber during the running with the lapse of time were evaluated by the aforementioned test methods. The test results are also shown in Table 2.

TABLE 2

| | Comparative Example 1 | Comparative Example 2 | Comparative Example 3 | Example 1 | Example 2 | Example 3 | Comparative Example 4 | Comparative Example 5 |
|---|---|---|---|---|---|---|---|---|
| Kind of tread rubber composition | Composition 1 | Composition 2 | Composition 3 | Composition 4 | Composition 5 | Composition 6 | Composition 7 | Composition 8 |
| Curing pressure (index) | 100 | 100 | 100 | 125 | 100 | 125 | 100 | 125 |
| Properties of expanded rubber — expansion ratio Vs (%) | 0 | 23 | 22 | 23 | 25 | 24 | 35 | 15 |
| Properties of expanded rubber — ratio of closed cell having a cell diameter of 5–30 μm (%) | — | 43 | 48 | 70 | 79 | 90 | 68 | 45 |
| Performances of tire — braking performance on ice (index) | 100 | 87 | 86 | 87 | 87 | 86 | 85 | 98 |
| Performances of tire — flattening appearance | ○ | x | △ | ○ | ○ | ⊚ | ○ | ⊚ |
| Performances of tire — wear resistance (index) | 100 | 60 | 75 | 96 | 95 | 105 | 66 | 106 |
| Performances of tire — initial hardness of rubber block in tire | 55 | 47 | 48 | 52 | 51 | 52 | 47 | 54 |
| Performances of tire — hardness of rubber block in tire after running over 5000 km | 63 | 58 | 57 | 54 | 53 | 53 | 50 | 56 |

As seen from Table 2, the braking performance on ice in the tires of Examples 1 to 3 are largely improved as compared with those of Comparative Examples 1 to 5. Furthermore, in Examples 1 to 3, the flattening appearance of the blocks after the running over a long period are largely improved, and also the wear resistance is a sufficiently practicable level substantially equal to that of the conventional tire (Comparative Example 1). Moreover, in the tires of Examples 1 to 3, there are caused no occurrence of damage in the vicinity of the tread shoulder, separation failure between the first and second joint end parts, cut failure of the expanded rubber and side damage due to the chain or the like, so that the tire durability is considerably improved. And also, the change of hardness in the tread after the running is considerably small as compared with those of Comparative Examples 1 to 5.

As mentioned above, according to the invention, the outer layer portion of the tread is composed of an expanded rubber containing a particular rubber component and particular high reinforcing carbon black and oil and the number of closed cells having a particular cell diameter in the expanded rubber is restricted to a certain range of the total number of closed cells, whereby the flattening phenomenon can largely be reduced in use on ice and snow road surface over a long period of time and the braking performance on ice and snow road surface can considerably be improved. Furthermore, the wear resistance is sufficient for practical use.

Moreover, the rubber reinforcing layer is arranged in the vicinity of the tread shoulder so as to cover the joint end part between outer and inner layer portions and joint end part between inner layer portion and sidewall. The the function of the tread is divided and the shoulder portion is reinforced and consequently the ice-snow performance in winter season can be improved together with performance in summer season and tire durability.

What is claimed is:

1. A pneumatic tire comprising; a tire casing, a tread covering a crown portion of said casing, said tread consisting of an outer layer portion comprised of an expanded rubber layer having a volume corresponding to at least 10% of a total volume of said tread and a non-expanded rubber inner layer portion, and a non-expanded rubber reinforcing layer in a shoulder portion covering a first joint end part between said outer layer portion and said inner layer portion and a second joint end part between said inner layer portion and a sidewall portion; and said expanded rubber layer entirely formed of an expanded rubber containing no less than 50 parts by weight of at least one rubber component selected from natural rubber, polybutadiene rubber and styrene-butadiene copolymer rubber all having a glass transition temperature of not higher than $-45°$ C., a high reinforcing carbon black having an $N_2SA$ of 90–180 m$^2$/g and not more than 10 parts by weight of an oil per 100 parts by weight of said rubber component; and said expanded rubber contains closed cells at an expansion ratio (Vs) of 5–50% so that the number of closed cells having a cell diameter of 5–30 μm is not less than 50% of total number of closed cells having a cell diameter or not less than 5 μm per unit area.

2. The pneumatic tire according to claim 1, wherein said carbon black is added in an amount of 30 to 70 parts by weight based on 100 parts by weight of said rubber component.

3. The pneumatic tire according to claim 1, wherein said carbon black is carbon black ISAF or SAF.

4. The pneumatic tire according to claim 1, wherein said volume of the expanded rubber is 10~70% of the volume of the tread.

5. The pneumatic tire according to claims 1, wherein said outer layer portion has a hardness of 39°~59° measured according to JIS K301.

* * * * *